(12) United States Patent
Drucker et al.

(10) Patent No.: US 7,257,591 B2
(45) Date of Patent: Aug. 14, 2007

(54) METHOD OF REFERENCING DATA VIA EDGE DEFINITION

(75) Inventors: Travis M. Drucker, Rochester, MN (US); Hoa T. Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 10/600,383

(22) Filed: Jun. 20, 2003

(65) Prior Publication Data
US 2004/0261015 A1    Dec. 23, 2004

(51) Int. Cl.
*G06F 17/30* (2006.01)
(52) U.S. Cl. .................................................. 707/101
(58) Field of Classification Search ............. 707/1–10, 707/100–104.1, 200–206; 345/419; 715/512
See application file for complete search history.

(56) References Cited

U.S. PATENT DOCUMENTS

| 6,581,068 B1 * | 6/2003 | Bensoussan et al. ..... 707/104.1 |
| 2003/0052875 A1 * | 3/2003 | Salomie ...................... 345/419 |

* cited by examiner

*Primary Examiner*—Diane Mizrahi
(74) *Attorney, Agent, or Firm*—Patterson & Sheridan, LLP (57) ABSTRACT

Methods, systems, and articles of manufacture for referencing a selection of data including a plurality of individual data points (e.g., database cells) are provided. Rather than store a reference to each individual data point, only sufficient information necessary to describe a bounding edge of the data selection (an "edge definition") may be stored, thus significantly reducing the amount of storage. Depending on the application, edge definitions may be used to describe two-dimensional or higher order selections of data.

25 Claims, 10 Drawing Sheets

| PRIMARY KEY | COLUMN A | COLUMN B | COLUMN C | COLUMN D | COLUMN E |
|---|---|---|---|---|---|
| 1 | DATA | DATA | DATA | DATA | DATA |
| 2 | DATA | DATA | DATA | DATA | DATA |
| 3 | DATA | DATA | DATA | DATA | DATA |
| 4 | DATA | DATA | DATA | DATA | DATA |
| 5 | DATA | DATA | DATA | DATA | DATA |
| 6 | DATA | DATA | DATA | DATA | DATA |
| 7 | DATA | DATA | DATA | DATA | DATA |
| 8 | DATA | DATA | DATA | DATA | DATA |
| 9 | DATA | DATA | DATA | DATA | DATA |
| 10 | DATA | DATA | DATA | DATA | DATA |
| 11 | DATA | DATA | DATA | DATA | DATA |
| 12 | DATA | DATA | DATA | DATA | DATA |

| CONVENTIONAL SELECTED DATA DESCRIPTION ||
|---|---|
| PRIMARY KEY | COLUMN |
| 2 | COLUMN B |
| 2 | COLUMN C |
| 2 | COLUMN D |
| 3 | COLUMN B |
| ... | ... |
| 11 | COLUMN D |

R x C
(3 x 10)

| PRIMARY KEY | COLUMN A | COLUMN B | COLUMN C | COLUMN D | COLUMN E |
|---|---|---|---|---|---|
| 1 | DATA | DATA | DATA | DATA | DATA |
| 2 | DATA | DATA | DATA | DATA | DATA |
| 3 | DATA | DATA | DATA | DATA | DATA |
| 4 | DATA | DATA | DATA | DATA | DATA |
| 5 | DATA | DATA | DATA | DATA | DATA |
| 6 | DATA | DATA | DATA | DATA | DATA |
| 7 | DATA | DATA | DATA | DATA | DATA |
| 8 | DATA | DATA | DATA | DATA | DATA |
| 9 | DATA | DATA | DATA | DATA | DATA |
| 10 | DATA | DATA | DATA | DATA | DATA |
| 11 | DATA | DATA | DATA | DATA | DATA |
| 12 | DATA | DATA | DATA | DATA | DATA |

FIG. 2B

| EDGE DEFINITION | |
|---|---|
| PRIMARY KEY | COLUMN |
| 2 | COLUMN B |
| 2 | COLUMN C |
| 2 | COLUMN D |
| 2 | COLUMN D |
| 3 | COLUMN D |
| 4 | COLUMN D |
| ... | ... |
| 11 | COLUMN D |

R + C (10 + 3)

| PRIMARY KEY | COLUMN A | COLUMN B | COLUMN B' | COLUMN C | COLUMN D | COLUMN E |
|---|---|---|---|---|---|---|
| 1 | DATA | DATA | DATA | DATA | DATA | DATA |
| 2 | DATA | DATA | DATA | DATA | DATA | DATA |
| 3 | DATA | DATA | DATA | DATA | DATA | DATA |
| 4 | DATA | DATA | DATA | DATA | DATA | DATA |
| 5 | DATA | DATA | DATA | DATA | DATA | DATA |
| 5.5 | DATA | DATA | DATA | DATA | DATA | DATA |
| 6 | DATA | DATA | DATA | DATA | DATA | DATA |
| 7 | DATA | DATA | DATA | DATA | DATA | DATA |
| 8 | DATA | DATA | DATA | DATA | DATA | DATA |
| 9 | DATA | DATA | DATA | DATA | DATA | DATA |
| 10 | DATA | DATA | DATA | DATA | DATA | DATA |
| 11 | DATA | DATA | DATA | DATA | DATA | DATA |
| 12 | DATA | DATA | DATA | DATA | DATA | DATA |

| EDGE DEFINITION (CONTIGUOUS) | |
|---|---|
| PRIMARY KEY LIST | 2,3,4,5,6,7,8,9,10,11 |
| COLUMN LIST | B,C,D |

| PRIMARY KEY | COLUMN A | COLUMN B | COLUMN C | COLUMN D | COLUMN E | COLUMN F | COLUMN G |
|---|---|---|---|---|---|---|---|
| 1 | DATA | DATA | DATA | DATA | DATA | DATA | DATA |
| 2 | DATA | DATA | DATA | DATA | DATA | DATA | DATA |
| 3 | DATA | DATA | DATA | DATA | DATA | DATA | DATA |
| 4 | DATA | DATA | DATA | DATA | DATA | DATA | DATA |
| 5 | DATA | DATA | DATA | DATA | DATA | DATA | DATA |
| 6 | DATA | DATA | DATA | DATA | DATA | DATA | DATA |
| 7 | DATA | DATA | DATA | DATA | DATA | DATA | DATA |
| 8 | DATA | DATA | DATA | DATA | DATA | DATA | DATA |
| 9 | DATA | DATA | DATA | DATA | DATA | DATA | DATA |
| 10 | DATA | DATA | DATA | DATA | DATA | DATA | DATA |
| 11 | DATA | DATA | DATA | DATA | DATA | DATA | DATA |
| 12 | DATA | DATA | DATA | DATA | DATA | DATA | DATA |

FIG. 2D

| EDGE DEFINITION (DISCONTIGUOUS) | | | | |
|---|---|---|---|---|
| | PARTITION 1 | PARTITION 2 | PARTITION 3 | PARTITION 4 |
| PRIMARY KEY LIST | 2,3,4,5 | 6,7 | 6,7 | 8,9,10,11 |
| COLUMN LIST | B,C,D,E,F | B,C | E,F | B,C,D,E,F |

METHOD OF REFERENCING DATA VIA EDGE DEFINITION

BACKGROUND OF THE INVENTION

1. Field of the Invention

The present invention relates to the field of data processing and, more particularly, to methods and systems for referencing selected portions of data.

2. Description of the Related Art

An annotation system is used to create, store, and retrieve descriptive information about objects. Annotations may exist in various forms, including textual annotations (e.g., descriptions, revisions, clarifications, comments, instructions, etc.), graphical annotations (e.g, pictures, symbols, etc.), sound clips, etc. Further, virtually any identifiable collection of data may be annotated, such as a database table (or spreadsheet), as well as any subportion (or sub-object) thereof, such as a column, row, or cell of the table.

These different data objects may be annotated for different reasons. For example, in a biomedical environment, a database table may be annotated to explain why it was created (e.g., for a particular branch of medical research), a column may be annotated to clarify the type of data it holds (e.g., test results), a row may be annotated to comment on a particular set of data (e.g., all related to a common patient), while an individual cell may be annotated to comment on the significance of a particular value stored therein (e.g., an alarmingly high test result). Further, annotations may also be made on a selected group of individual cells, for example, to comment on an important relationship between cells in the group.

Some annotation systems store annotations separately, without modifying the annotated data objects themselves. For example, annotations are often contained in annotation records stored in a separate annotation store, typically a database. The annotation records typically contain information about the annotations contained therein, such as the creation date and author of the annotation, and an identification of the annotated data object, typically in the form of an index that may be used to retrieve a reference to the annotated data. For example, when retrieving a set of annotations for a document, corresponding references may be retrieved as well, to identify the annotated data. The format of the corresponding references may vary depending on the type of data annotated.

For example, a reference to a database table may include a location and name of the table, for example, as a network file path or Uniform Resource Locator (URL). In addition, a reference to a column may include a column name (or number), a reference to a row may include a row number, while a reference to a cell may include both a column name and row number. Thus, references to all these types of data objects may be stored relatively easily and efficiently. A reference to a selected group of cells, on the other hand, presents a challenge, as the reference must include (provide an indication of) each individual cell in the group.

One conventional approach to ensure each individual cell in the group is included is to explicitly reference each individual cell in the selected group, for example, as a column name/row number pair. However, as a selected group may span hundreds of cells that each need to be referenced, this approach may result in inefficient storage, particularly as each selected group of cells may have several associated annotations. Further, when retrieving annotations and references to the corresponding annotated data from a network connected annotation database, transmitting the large number of column/row pairs may consume valuable network bandwidth.

One alternative approach is to store column/row pairs for only the corners of the selected group of cells, resulting in more efficient storage. A disadvantage to this approach, however, is that a reference storing only column/row pairs for the corners may become invalid when column and/or rows are inserted into or deleted from the table. For example, the content of the annotation may have described a relationship between a deleted row/column with others, or the description may not apply to inserted rows/columns. Another disadvantage to this approach is that only contiguous selections of data may be accurately referenced by their corners, thus preventing the use of this approach for discontiguous selections of data (e.g., that exclude certain portions of data within the four corners).

Accordingly, there is a need for an improved method for referencing a selected group of data, preferably that results in efficient storage, as well as flexible representation of different types of selected groups.

SUMMARY OF THE INVENTION

The present invention generally is directed to a method, system, and article of manufacture for referencing annotated data selections.

One embodiment provides a method for annotating a selection of data from a collection of data. The method generally includes creating an annotation for the data selection, creating a reference to the data selection, the reference containing sufficient information to define one or more bounding edges of the data selection, creating an index for the data selection, and creating an annotation record containing the annotation and the index created for the data selection.

Another embodiment provides a computer-readable medium containing a program for annotating a selection of data. When executed by a processor, the program performs operations generally including receiving a first selection of data spanning at least two columns and at least two rows of a two-dimensional collection of data, creating an edge definition for the first selection of data comprising sufficient information to define a horizontal edge spanning the at least two columns and a vertical edge spanning the at least two rows, and storing the edge definition in an edge definition table.

Another embodiment provides an annotation system generally including an annotation database, an edge definition table, and an executable component. The executable component is generally configured to create an edge definition for a selection of data, the edge definition comprising sufficient information to define one or more bounding edges of the selection of data, create an index for the selection of data, store the edge definition and index for the selection of data in the edge definition table, and store, in the annotation database, an annotation record comprising an annotation for the selection of data and the index.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A and 2B–2D illustrate various selections of data and corresponding possible representations according to the prior art and embodiments of the present invention, respectively.

DETAILED DESCRIPTION OF THE PREFERRED EMBODIMENTS

The present invention provides methods, systems, and articles of manufacture for referencing a selection of data including a plurality of individual data points (e.g., database cells). Rather than store a reference to each individual data point, only sufficient information necessary to describe one or more bounding edges of the data selection (referred to hereinafter as an "edge definition") may be stored, thus significantly reducing the amount of data stored. For example, for a two-dimensional rectangular selection of data, the edge definition may include row/column pairs for cells along horizontal and vertical edges bounding the selection.

As used herein, the term annotation generally refers to any type of descriptive information associated with one or more data objects. Annotations may exist in various forms, including textual annotations (descriptions, revisions, clarifications, comments, instructions, etc.), graphical annotations (pictures, symbols, etc.), sound clips, etc. As described above, annotated data objects may also exist in various forms and embodiments of the present invention may be used to particular advantage in describing an annotated selection of data points arranged in a two-dimensional relational or tabular format. However, aspects of the present invention may also be used to described higher dimensional data (e.g., 3-D models), for example, by defining a bounding surface. Further, while aspects of the present invention may be practiced with advantage to reference data described by an annotation, some aspects may also be applied more generally in any context where one set of data is referencing or pertaining to another set of data (e.g., when manipulating a selection of data in a "clipboard" via copying, cutting, pasting, etc.).

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Figure 1:
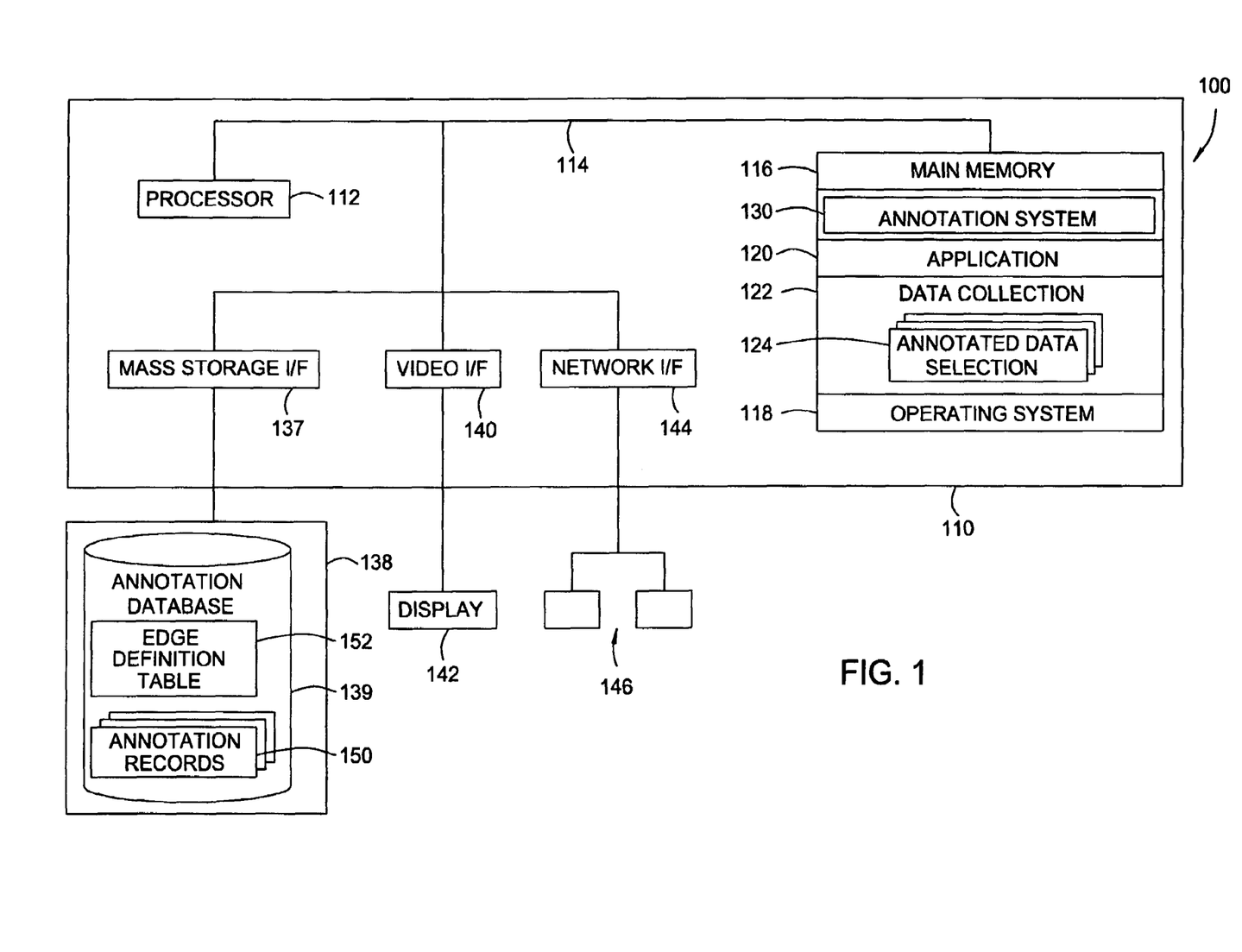
FIG. 1 is a computer system illustratively utilized in accordance with embodiments of the present invention.

Referring now to FIG. 1, the data processing environment 100 is shown. In general, the data processing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked workstations, servers, printers, and network accessed storage (NAS) devices.

Computer system 110 is shown comprising at least one processor 112, which obtains instructions and data via a bus 114 from a main memory 116. The processor 112 could be any processor adapted to support the methods of the invention. Main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, main memory 116 may be considered to include memory physically located elsewhere in a computer system 110, for example, any storage capacity used as virtual memory or stored on a mass storage device (e.g., DASD 138) or on another computer coupled to the computer system 110 via bus 114.

Main memory 116 is shown configured with an operating system 118. The operating system 118 is the software used for managing the operation of the computer system 110. Examples of suitable operating systems include such as IBM's OS/400, IBM's AIX, Unix, Linux, Microsoft Windows®, and the like. Main memory 116 further includes at least one application 120 and an annotation system 130.

The application 120 and the annotation system 130 are software products comprising a plurality of instructions that are resident at various times in various memory and storage devices in the computer system 110. When read and executed by one or more processors 112 in the computer system 110, the application 120 and the annotation system 130 cause the computer system 110 to perform the steps necessary to execute steps or elements embodying the various aspects of the invention. The application 120 is generally configured to access (ie., generate, edit, modify, display, etc.) a collection of data 122.

The data collection 122 may be any type multi-dimensional collection of data, such as a two-dimensional relational or tabular matrix of data, such as a spreadsheet, a database table, a collection of data resulting from a join operation of more than one database table, or any other multi-dimensional collection of data. As illustrated, a selected portion 124 of the data collection 122 may be annotated. As will be described in greater detail below, the annotated data selection 124 may include any contiguous or non-contiguous selected group of data points (e.g., database or spreadsheet cells) contained in the data collection 122. As previously described, each data point in the data collection 122 may generally be uniquely described by a pair of row and column values.

While illustrated as separate from the application 120, for some embodiments, the annotation system 130 may be an integral part of the application 120 or a "plug-in" application. In either case, the annotation system 130 is generally configured to allow users of the application program 120 to generate, store, and retrieve annotations associated with the data collection 122. The annotations may be contained in annotation records 150, for example, stored in an annotation database 139 (e.g., in the DASD 138). The annotation records 150 may also contain various information about the annotation, such as the author and creation date of the annotation, as well as an index identifying the annotated data (e.g., the annotated data selection 124). For example, the index may indicate an edge definition (stored in an edge definition table 152) containing information that describes the annotated data selection 124.

Referencing Data via Edge Definitions

Figure 2A:
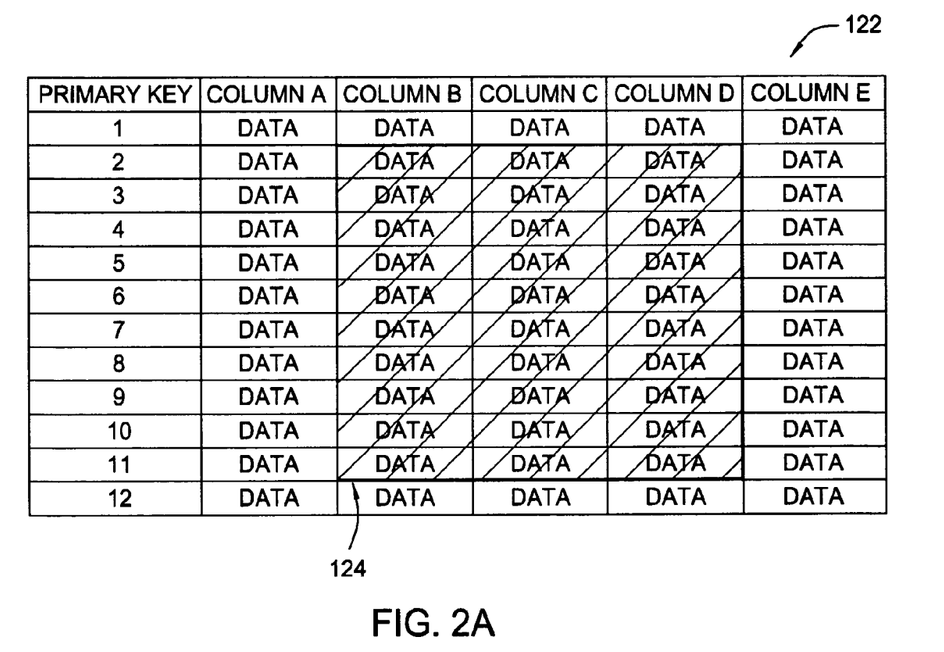

The concepts of edge definitions may best be described with reference to FIGS. 2A and 2B–2D, which illustrate various selections of data and corresponding representations according to the prior art and embodiments of the present invention using edge definitions, respectively. As illustrated in FIG. 2A, a collection of data 122 may comprise a two-dimensional array of cells, arranged as a plurality of columns (as shown columns A–E) and rows (as shown rows 1–12), which may be indexed by their primary keys. A primary key is a unique identifier for an entity in a database table (e.g., a social security is often used as a primary key and, in some cases, multiple column values, such as a first and last name, may be used as a primary key). Therefore, each cell in a database table may be identified by a primary key and column value pair.

An annotated selection 124 may include data points that span several columns and rows of the collection of data 122. To simplify discussion, data points will be referred to by their column and row (e.g., D-7, A-1, and the like). According to a conventional approach, the selection 124 may be described (with a conventional description $154_A$) by a list of row (e.g. primary key) and column value pairs that define each cell in the selection 124 (e.g., B-2, B-3, . . . , D-11). As illustrated, this conventional description requires R×C (where R is the number of rows and C is the number of columns) data points to describe the selection 124. As previously described, this description may be stored in the annotation database 139 to identify the data selection 124 described by an associated annotation.

However, as an annotated selection may span hundreds of cells, and several annotations may be associated with selection, this conventional description may require too much storage. Further, as the annotation database 139 is often located in a storage device or server accessed via a network connection, the size of this conventional description $154_A$ may undesirably consume too much bandwidth. Embodiments of the present invention, however, provide alternative descriptions of data selections that require less descriptive data and, therefore, require less memory and CPU overhead for processing (fewer records to process, consume less storage space, and consume less network bandwidth).

One alternative description, embodied as the edge definition $154_B$ shown in FIG. 2B, contains sufficient information to describe one or more bounding edges of the data selection 124. For example, as illustrated, the data selection 124 is bound by a horizontal edge 125 (spanning columns B–D) and a vertical edge 127 (spanning rows 2–11). Rather than include a list of row and column value pairs that define each cell in the selection 124, the edge definition $154_B$ may include a list of only data points (e.g., row-column pairs) along these bounding edges. Thus, as illustrated, the edge definition 154B may include only R+C data points, which represents a significant reduction from the R×C data points listed in the conventional description $154_A$. Of course, as the edges 125 and 127 share a common data point (corner D-2), the edge definition may actually include only R+C-1 data points.

Figure 2C:
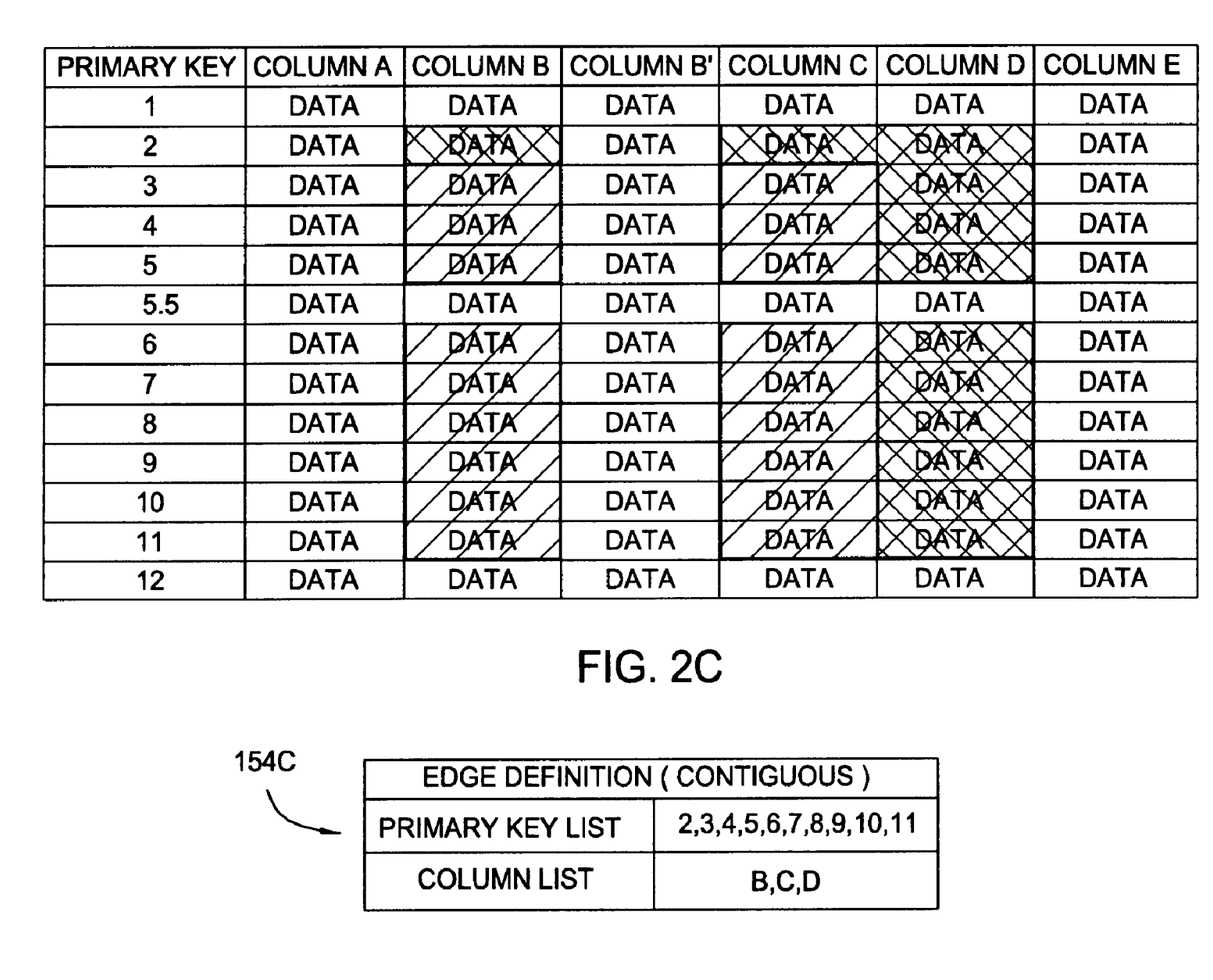

An even more storage efficient description of the data selection 124 is illustrated as edge definition $154_C$ in FIG. 2C. As shown, the edge definition $154_C$ departs from the paired primary key and column scheme and uses two lists for the row (2, 3, 4, 5, 6, 7, 8, 9, 10, 11) and column values (B, C, and D), thus requiring less data to store. The row and column lists of the edge definition $154_C$ may be readily combined to generate all of the data points in the selection 124.

As illustrated in FIG. 2C, while being more storage efficent than the conventional description $154_A$, the definitions $154_B$ and $154_C$ (collectivelyedge definitions 154) still allow for modifications to the collection of data 122, without requiring modifications to the edge definitions themselves. For example, as illistrated in FIG. 2C, even after the illistration of a new row (shown as row 5.5) and/or the insertion of a new column (shown as column B'), the edge definitions 154 accurately describe the original data selection 124 (i.e., the edge definitions 154 do not refer to either row 5.5 or column B'). This may be of advantage, for example, if the annotation is valid only with respect to the original annotated data selection 124. However, as will be described in greater detail below (with reference to FIGs. 6 and 7), for some embodiments, a user may be provided the option to update an edge definition 154, for example, in the event that an annotation also applies to an annotated data selection, as modified.

Figure 2D:
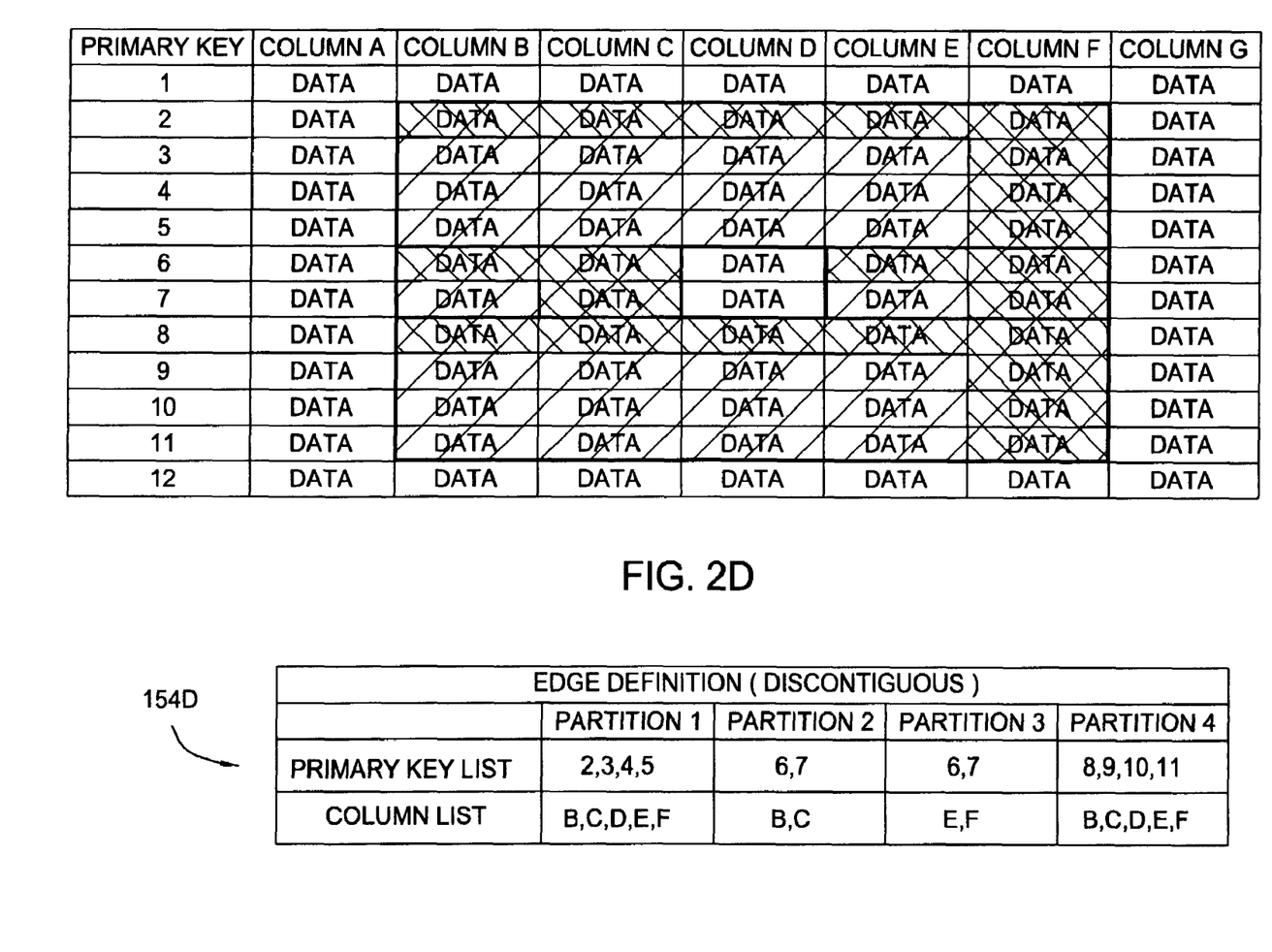

Edge definitions 154 are not limited to describing data selections 124 containing contiguous data points. For example, as illustrated in FIG. 2D, an edge definition $154_D$ may describe a selection of data 124 having one or more discontiguous sections (as shown, two points D-6 and D-7 are not included). In order to create the edge definition $154_D$, the discontiguous selection 124 may first be partitioned into contiguous sections and then an edge definition may be generated for each contiguous section. The edge definitions for each contiguous partition may be stored as row-column value pairs or as separate lists of row values and column values.

For example, as shown in FIG. 2D, the selection 124 may be partitioned into a first partition defined by rows 2–5 and columns B–F, a second partition defined by rows 6–7 and columns B–C, a third partition defined by rows 6–7 and columns E–F, and a fourth partition defined by rows 8–11 and columns B–F. Of course, depending on the discontiguous selection, a number of different partitions may be possible (e.g., partition 1 could be defined by rows 2–11 and columns B–C, partition 2 could be defined by rows 2–5 and columns D–F, and so on). Regardless, the creation of edge definitions for contiguous partitions allows efficient storage of references that accurately describe a larger discontiguous data selection.

While the examples shown in FIGS. 2A–2D illustrate two-dimensional selections of data, the concepts of edge definitions may also be applied to describe higher order selections of data. As an example, an edge definition may be created to define a surface in a three-dimensional data space. Depending on the embodiment, the surface descriptions may contain a set of points on the described surface or sufficient information to build formulas (e.g., mathematical equations) that describe the surface. For example, the surface description may include a point of origin and radius to describe a sphere, or a set of corner points to describe a cube. Further, data selections bound by more complex surfaces may be partitioned to allow their description by simpler surface shapes (such as a cube or sphere).

As an application example, in a medical research environment, a collection of data may be embodied as a three-dimensional model of a protein. A medical researcher (e.g., a doctor, scientist, lab technician, or the like) may wish to comment on an active site or interface of a given protein (e.g., including a finite number of molecules). The protein model may be stored in a database as a series of vectors. To associate the comment to the active site, an edge (surface) definition may be created that describes the set of vectors on the three dimensional surface containing the active site, which is more efficient then describing all vectors contained within the surface. As another example, to further simplify the description, the active site may be described by a point of origin and radius of a sphere containing the active site.

Creating and Applying Edge Definitions

Figure 3:
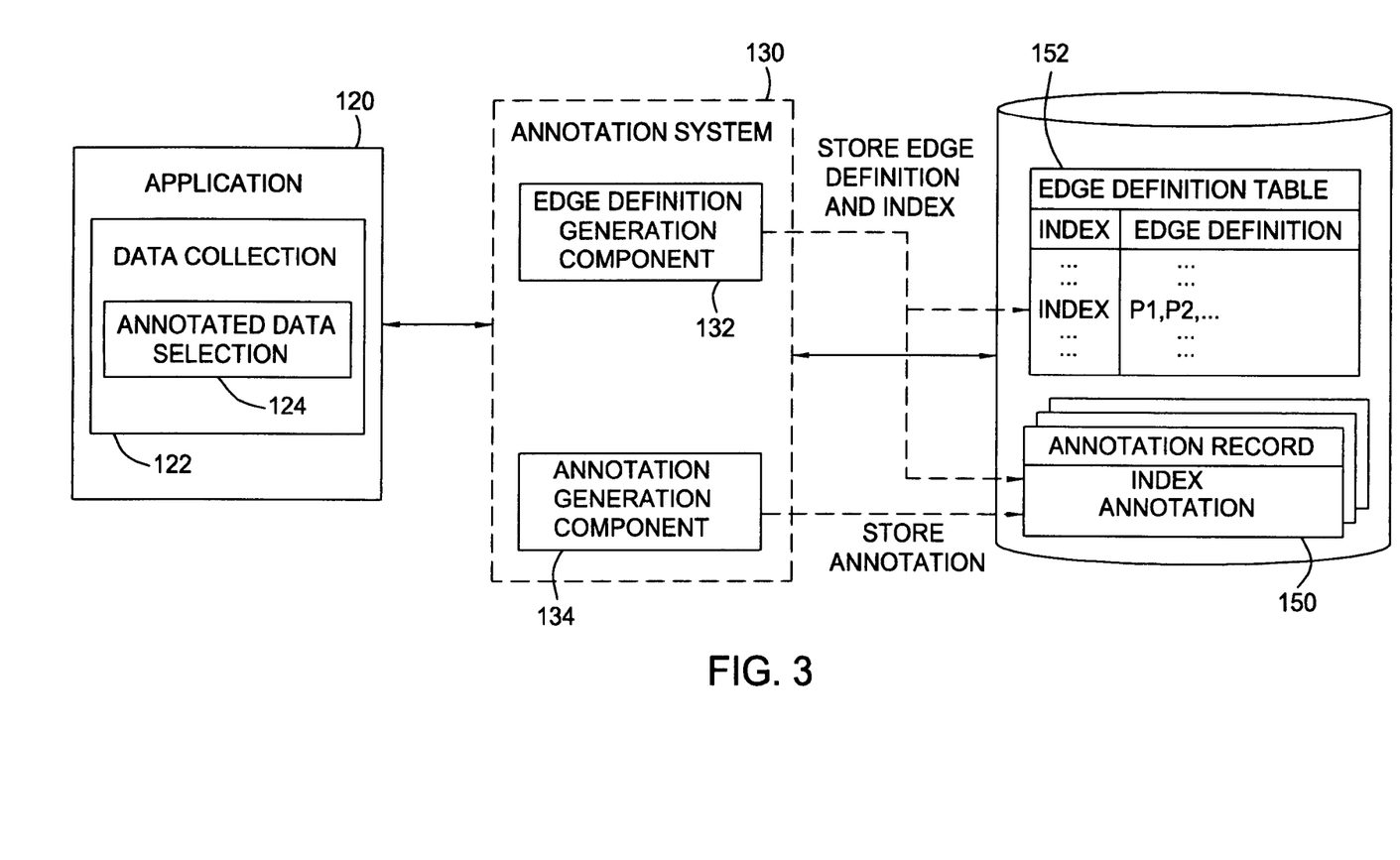
FIGS. 3 is a relational view of exemplary components according to one embodiment of the present invention.

FIG. 3 is a relational view of various components of one embodiment of the annotation system 130 that may be configured to create edge definitions for annotated data selections 124, for example, during an annotation generation process. Operation of various components illustrated in FIG. 3 may best be described with reference to FIG. 4 which is a flow diagram of exemplary operations 400 for creating an edge definition, that may be performed by the annotation system 130, according to one embodiment of the present invention. The operations 400 begin, at step 402, by creating an annotation for a selection of data. For example, a user of the application 120 may highlight the selection 124 and invoke the annotation system 130 to annotate the highlighted selection 124. As illustrated, the annotation system 130 may include an annotation generation component 134, such as a graphical user interface (GUI), configured to allow the user to create an annotation for the selection 124. As previously described, the selection 124 may be contiguous or discontiguous.

Figure 4:
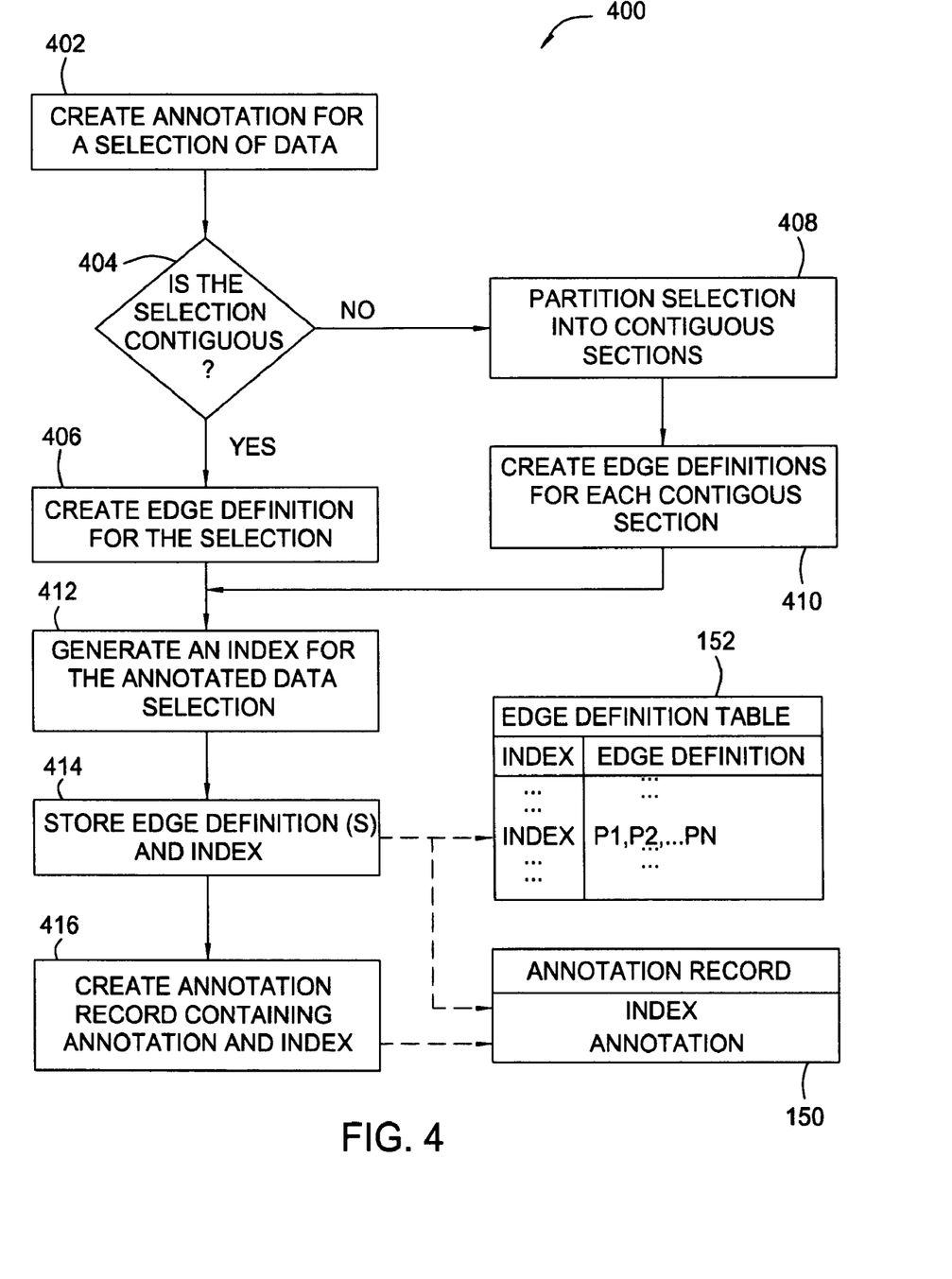
FIG. 4 is a flow diagram of exemplary operations for referencing a selection of data according to one embodiment of the present invention.

Therefore, at step 404, a determination is made as to whether the selection 124 is contiguous. If the selection 124 is contiguous, processing proceeds to step 406 to create an edge definition for the selection 124. If the selection 124 is not contiguous, processing proceeds to step 408 to partition the selection 124 into contiguous sections and, at step 410, edge definitions are created for each contiguous section. In either case, at step 412, an index is created for the selection 124, using any suitable indexing technique, and, at step 414, the edge definition (or partition edge definitions) are stored with the index, for example, as an entry in the edge definition table 152. While shown as stored in a separate edge definition table 152, edge definitions may be more generally stored in any other suitable type indexing table, or any other suitable type data object. Further, in some cases, an index (e.g., primary key) may have already been created for the selection 124 (e.g., the selection 124 may have already been annotated) and, therefore, step 412, may not be required. At step 416, an annotation record 150 is created containing the annotation and the index created for the selection 124.

Figure 5:
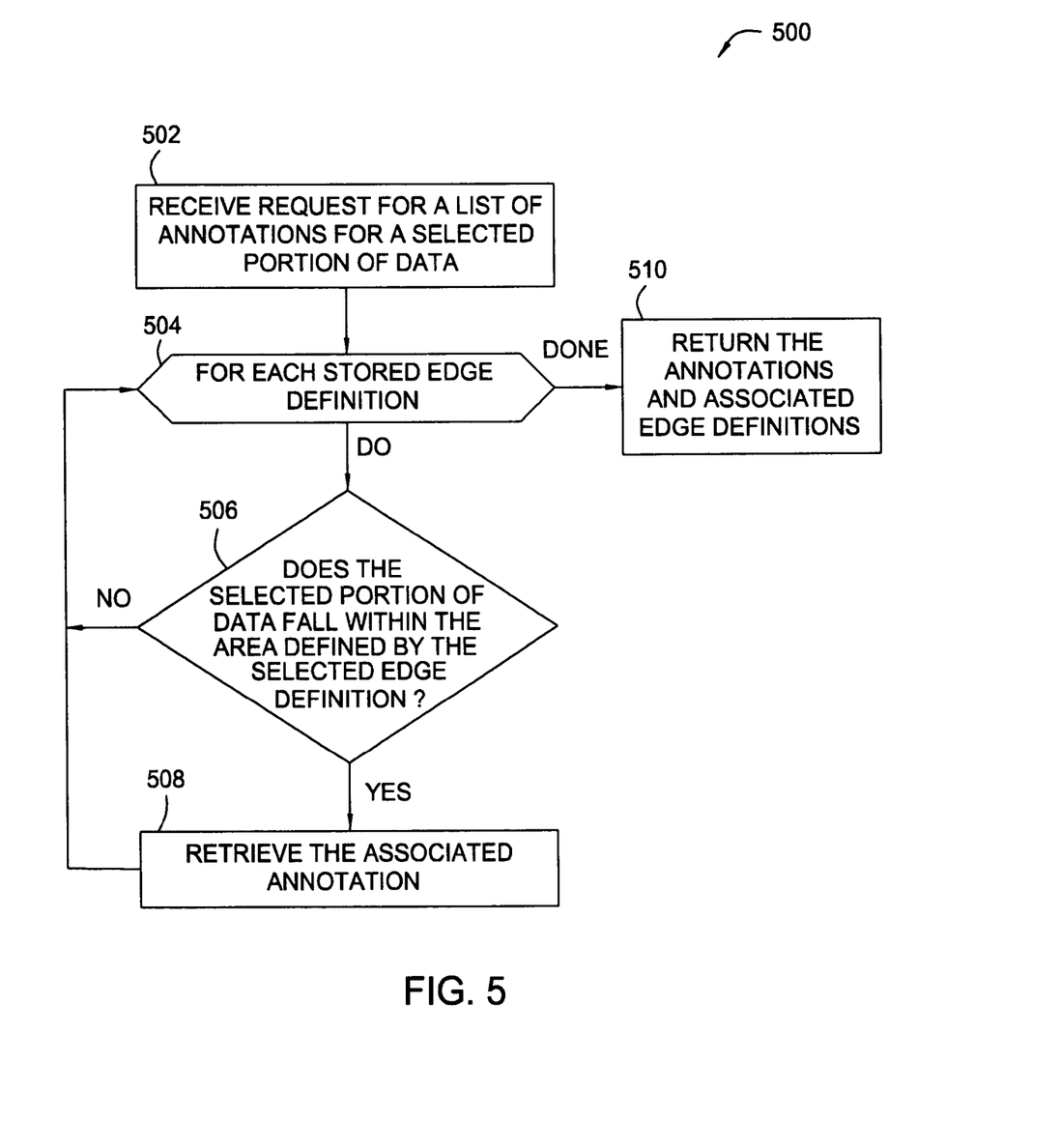
FIG. 5 is a flow diagram of exemplary operations for retrieving annotations for a selected portion of data according to one embodiment of the present invention.

As previously described, by storing the index in the annotation record, the corresponding annotated data selection may be readily identified. Similarly, given the index for an annotated data selection, the corresponding annotation may be readily retrieved. In some instances, a user may request a list of annotations associated with a selected portion of data, for example, of particular interest to the user. For example, the user may select the portion of data from an application 120 and invoke the annotation system 130 to request a list of annotations associated with the selected portion. FIG. 5 is a flow diagram of exemplary operations 500 that may be performed by the annotation system 130 to return a list of annotations associated with a selected portion of data.

The operations 500 begin, at step 502, by receiving a request for a list of annotations for a selected portion of data. If the selected portion of data were identical to a previously annotated (and indexed) selection, an index could be created for the selected portion and the associated annotations could be retrieved directly from the annotation database using the index. However, to accommodate selected portions of data that differ from previously annotated selections, the annotation system 130 may be configured to first search the edge definition table 152 to determine if any previously annotated data selections at least partially contain (i.e., overlap with) the selected portion of data.

At step 504, a loop of operations is entered, to be performed for each stored edge definition, to determine if any previously annotated data selections overlap with the selected portion of data. At step 506, a determination is made as to whether the selected portion of data falls within an area (i.e., range of data points) defined by a selected edge definition. If so, the corresponding annotated data selection at least partially contains the selected portion of data and, therefore, the associated annotation is retrieved, at step 508, for example, using the index stored with the edge definition. Once the loop of operations have been repeated for each stored edge definition, the annotations retrieved and (optionally) associated edge definitions are returned, at step 510. Returning the associated edge definitions may allow the application program 120 to provide an indication of the specific data selections associated with the returned annotations. Recall that, due to their smaller size, less network bandwidth may be required to return the edge definitions than conventional references.

Data Selection Modification

As previously described, data selections described by edge definitions may allow for modification to a the collection of data from which the data was selected (e.g., insertion/deletion of a row/column within the data selection) while still accurately describing the original data selection. This is particularly advantageous when the associated annotation does not apply to newly added data (e.g. inserted rows or columns). However, in some cases, it may be desirable to modify an annotation or an edge definition to reflect a modification to an annotated selection of data.

Figure 6:
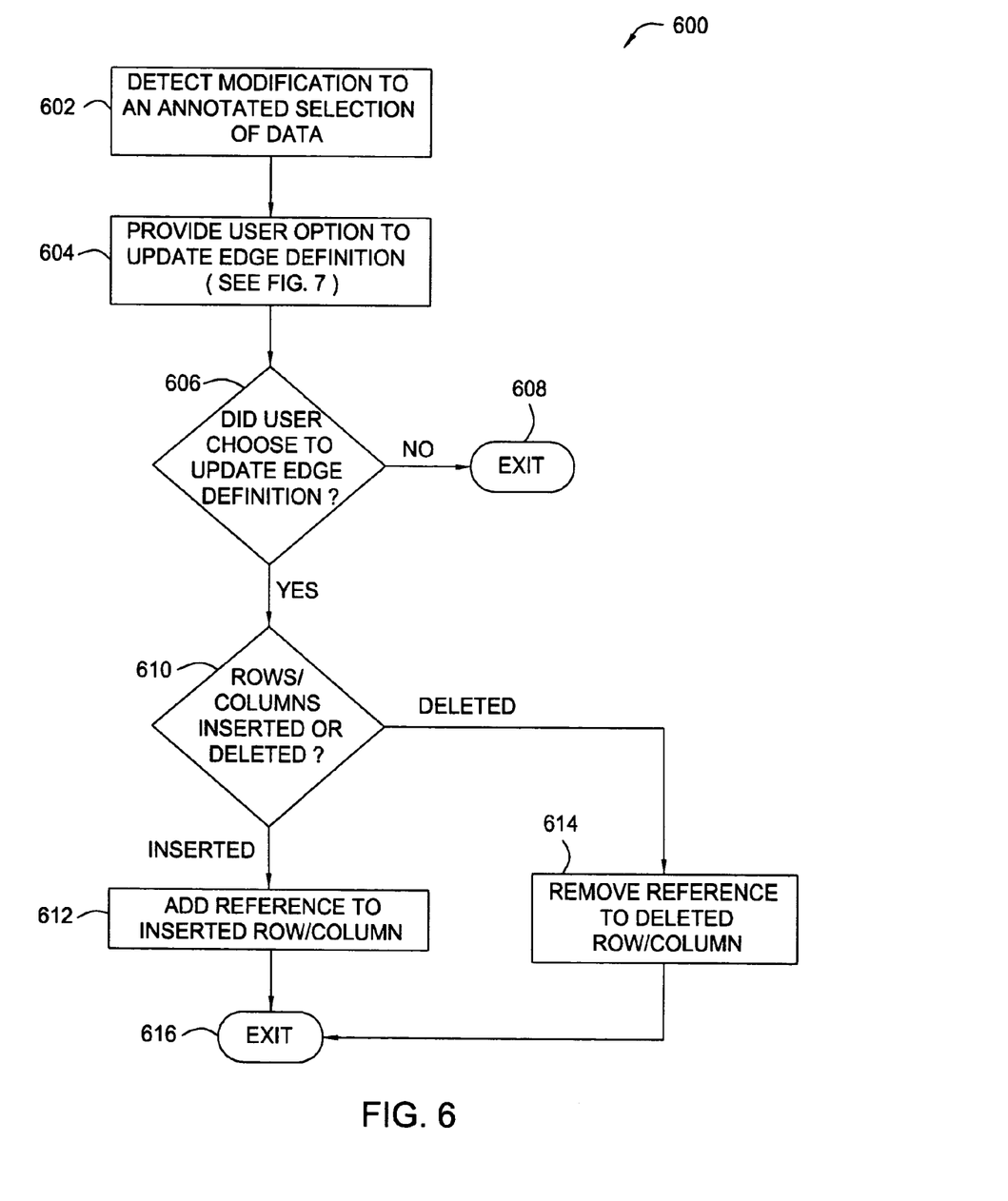
FIG. 6 is a flow diagram of exemplary operations for modifying annotations for a selected portion of data according to one embodiment of the present invention.

FIG. 6 is a flow diagram of exemplary operations 600 that may be performed to allow for updates to edge definitions in response to detecting changes to an annotated selection of data (i.e., changes to a collection of data within a data selection). The operations 600 begin, at step 602, by detecting a modification of an annotated selection of data. For example, the annotation system 130 may be configured to detect insertion/deletion events within an application 120 and scan the edge definition table 152 to determine if any rows and/or columns were inserted or deleted within a selection of data described by a stored edge definition. If so, a user may be provided the option to update an associated edge definition.

Figure 7:
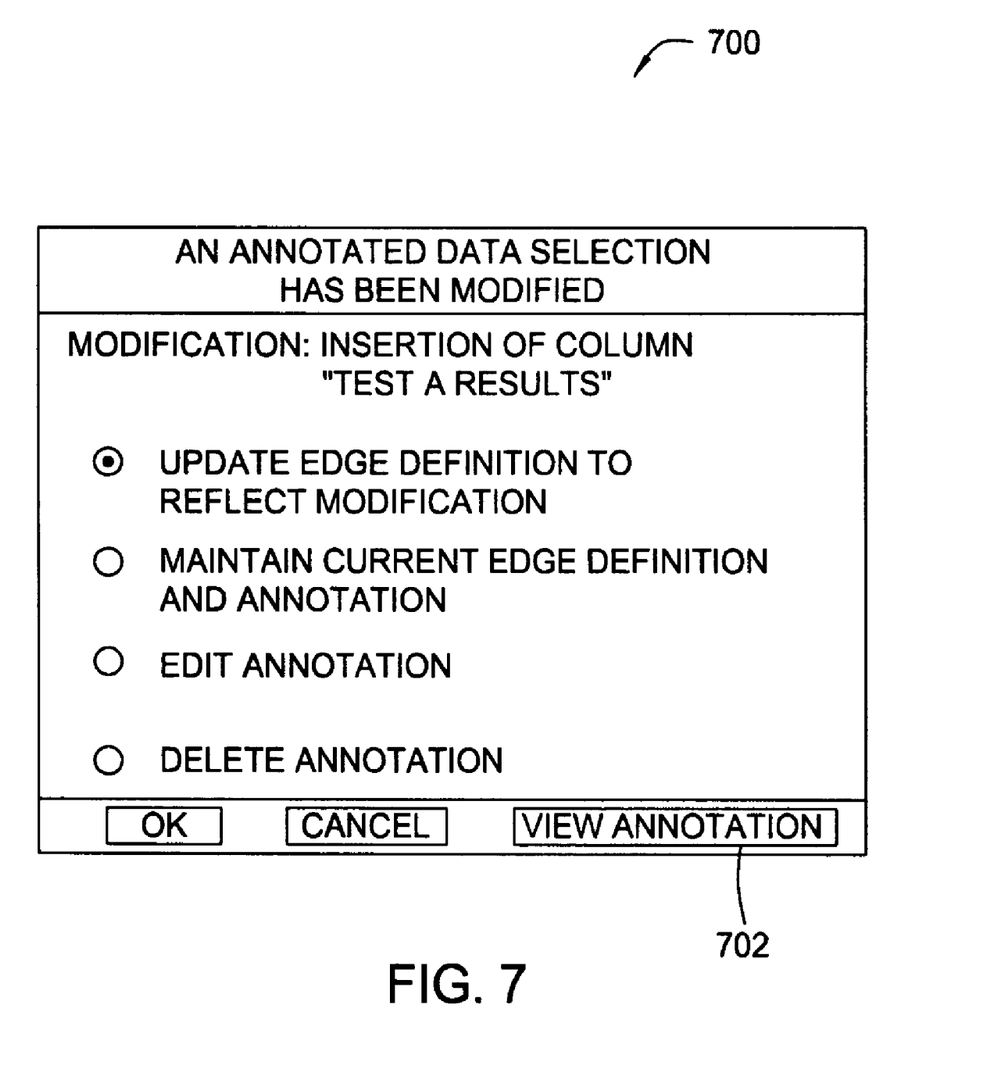
FIG. 7 is an exemplary graphical user interface (GUI) screen according to one embodiment of the present invention.

For example, the annotation system 130 may present the user with a graphical user interface (GUI) screen, such as the GUI screen 700 shown in FIG. 7. As illustrated, the GUI screen 700 may provide the user with an indication of the modification to the annotated data selection. The user may also be provided with the option to view the associated annotation, via a View Annotation button 702, for example to determine if the annotation applies to a newly inserted row or column or if the annotation is still valid after the deletion of a row or column. The user may also be provided a set of radio buttons allowing the user to choose one of a predefined set of operations. For example, as shown, the user may choose to update the edge definition to reflect the modification (e.g., if the annotation applies to the data selection, as modified), maintain the current edge definition and annotation (e.g., if the annotation does not apply to inserted rows/or columns), edit the annotation to reflect the modification (e.g., via a separate annotation generation GUI), or delete the annotation (e.g., if the annotation is not valid after the modification). For some embodiments, a user may be provided with similar options upon detecting a change to actual data within a selection of data (e.g., changes to actual data values may affect the validity of an annotation).

Referring back to FIG. 6, if the user does not choose to update the edge definition, the operations 600 are exited at step 608. However, if the user does choose to update the edge definition, processing proceeds to step 610, to determine if rows and/or columns were inserted or deleted. If rows and/or columns were inserted, the edge definition may be updated by adding a reference to the inserted rows and/or columns. For example, additional row-column pairs may be added (or additional values may be added to row value and/or column value lists) to reflect a modified bounding edge due to the modification. On the other hand, if rows and/or columns were deleted, the edge definition may be updated by removing reference to the deleted rows and/or columns. In either case, the operations 600 are exited, at step 616, for example, by returning control to the application 120.

CONCLUSION

Rather than store a reference to each individual data point in a selection of data, embodiments of the present invention store only sufficient information necessary to describe one or more bounding edges of the data selection. Thus, by utilizing edge definitions, significant reductions in the amount of storage required to reference annotated selections of data may be realized when compared to the storage requirements of traditional techniques. In addition to reduced storage requirements, referring to annotated data selections via edge definitions may also result in reduced bandwidth when retrieving annotations and the associated selections annotated via a network connection.

While the foregoing is directed to embodiments of the present invention, other and further embodiments of the invention may be devised without departing from the basic scope thereof, and the scope thereof is determined by the claims that follow.

What is claimed is:

1. A computer-implemented method for referencing a plurality of data points, from a collection of data, comprising:

creating an annotation associated with the plurality of data points;

creating an edge definition for the plurality of data points comprising information which defines at least two edges that bind the plurality of data points wherein the edge definition comprises a fewer number of data points than the plurality of data points;

storing the annotation;

storing the edge definition in association with the annotation in a manner allowing retrieval of the annotation on the basis of the edge definition for a specified set of plurality of data points;

receiving a request for annotations for a second selection of data;

retrieving the annotation created for the first selection of data upon determining that the second selection of data is contained, at least partially, within the first selection of data, based on the edge definition for the first selection of data; and returning the retrieved annotation.

2. The computer-implemented method of claim 1, wherein storing the edge definition in association with the annotation in a manner allowing retrieval of the annotation on the basis of the edge definition for a specified set of plurality of data points comprises creating an index for the annotation and storing the edge definition with the index.

3. The computer-implemented method of claim 1, wherein the plurality of data points comprises a discontiguous set of data points.

4. The computer-implemented method of claim 3, wherein creating the edge definition comprises:

partitioning the plurality of data points into sections of contiguous data points; and creating an edge definition for each section of contiguous data points, the edge definition for each section containing information which defines one or more bounding edges of the corresponding section.

5. The computer-implemented method of claim 1, wherein the edge definition comprises a list of data points defining a horizontal edge and a vertical edge of a two-dimensional array, each data point specified by a row value and a column value.

6. The computer-implemented method of claim 1, wherein the edge definition comprises a list of row values and a list of column values, the lists combinable to generate a set of data points defining a horizontal edge.

7. The computer-implemented method of claim 1, wherein the plurality of data points comprises at least three dimensions.

8. The computer-implemented method of claim 7, wherein the plurality of data points is bound by a surface of a sphere.

9. The computer-implemented method of claim 8, wherein the edge definition comprises a point of origin and a radius of the sphere.

10. A computer-readable storage medium containing a program which, when executed by a processor, performs operations comprising:
receiving a first selection of data comprising a plurality of data points and spanning at least two columns and at least two rows of an at least two-dimensional collection of data;
creating an edge definition for the first selection of data which defines a horizontal edge spanning the at least two columns and a vertical edge spanning the at least two rows wherein the edge definition comprises a fewer number of data points than the first selection of data;
storing the edge definition in association with an annotation created for the first selection of data, wherein the edge definition is stored in association with the annotation in a manner allowing retrieval of the annotation on the basis of the edge definition for the first selection of data; wherein the storing comprises:
creating an index for the first selection of data; and
storing the index with the edge definition in the edge definition table;
receiving a request for annotations for a second selection of data;
retrieving the annotation created for the first selection of data upon determining that the second selection of data is contained, at least partially, within the first selection of data, based on the edge definition for the first selection of data; wherein retrieving the annotation is done using the index created for the first selection of data; and
returning the retrieved annotation.

11. The computer-readable storage medium of claim 10, wherein:
the first selection of data comprises a discontiguous set of data points;
creating an edge definition for the first selection of data comprises partitioning the selection into sections of contiguous data points; and
the edge definition comprises data points which define a horizontal edge and a vertical edge of each section of contiguous data points.

12. The computer-readable storage medium of claim 10, wherein the operations further comprise creating an annotation record comprising the annotation created for the first selection of data and the index.

13. The computer-readable storage medium of claim 10, wherein the operations further comprise:
retrieving annotations associated with other selections of data upon determining that the second selection of data is contained, at least partially, within the other selections of data, based on corresponding edge definitions for the other selections of data; wherein retrieving the annotations is done using indexes created for the other selections of data; and returning the annotations for the other selections of data.

14. An annotation systems comprising:
an annotation database;
an edge definition table; and
an executable component configured to:
create an edge definition for a selection of data comprising a plurality of data points, the edge definition comprising data points which define one or more bounding edges of the selection of data wherein the edge definition comprises a fewer number of data points than the selection of data,
create an index for the selection of data,
store the edge definition and index for the selection of data in the edge definition table, and store, in the annotation database, an annotation record comprising an annotation for the selection of data and the index, whereby annotation records contained in the annotation database are retrievable, for a specified set of data points of the selection of data, on the basis of the edge definition.

15. The annotation system of claim 14, wherein the edge definition comprises data points which define a three dimensional surface that contains the selection of data.

16. The annotation system of claim 15, wherein the edge definition comprises a point of origin and a radius of a sphere that contains the selection of data.

17. The annotation system of claim 14, wherein the executable component is configured to:
receive, from an application program, a request for annotations associated with a selection of data specified in the request;
obtain, from the edge definition table, indexes for edge definitions at least partially containing the selection of data specified in the request;
retrieve annotations from the annotation database, using the indexes obtained; and
return the annotations retrieved to the requesting application program.

18. The annotation system of claim 14, wherein:
the selection of data spans at least two rows and two columns of data; and
the edge definition for the selection of data comprises data points which define a horizontal edge spanning the at least two columns and a vertical edge spanning the at least two rows.

19. The annotation system of claim 18, wherein the edge definition for the selection of data comprises data points along the horizontal and vertical edges, each data point defined by a row value and a column value.

20. The annotation system of claim 18, wherein the edge definition for the selection of data comprises a list of row values and a list of column values, combinable to generate data points along the horizontal and vertical edges of the data selection.

21. The annotation system of claim 18, wherein the executable component is further configured to:
detect a change to a collection of data within an area of data defined by a stored edge definition; and
provide an indication to a user of the change.

22. The annotation system of claim 21, wherein the change comprises at least one of an insertion of a row, a deletion of a row, an insertion of a column, or a deletion of a column.

23. The annotation system of claim 22, wherein the executable component is further configured to provide the user with the option of updating the stored edge definition to reflect the change.

24. The annotation system of claim 22, wherein the executable component is further configured to provide the user with the option of deleting an annotation associated with the stored edge definition.

25. The annotation system of claim 22, wherein the executable component is further configured to provide the user with the option of viewing an annotation associated with the stored edge definition.

\* \* \* \* \*